US011458799B2

(12) United States Patent
Cohan et al.

(10) Patent No.: US 11,458,799 B2
(45) Date of Patent: Oct. 4, 2022

(54) VEHICLE THERMAL MANAGEMENT SYSTEMS AND METHODS

(71) Applicant: Nikola Corporation, Phoenix, AZ (US)

(72) Inventors: Aiden Cohan, Phoenix, AZ (US);
Rachel Cook, Phoenix, AZ (US);
Akshit Markan, Phoenix, AZ (US);
Mitchell Shinn, Phoenix, AZ (US);
Katherine Smith, Phoenix, AZ (US)

(73) Assignee: Nikola Corporation, Phoenix, AZ (US)

( * ) Notice: Subject to any disclaimer, the term of this patent is extended or adjusted under 35 U.S.C. 154(b) by 0 days.

(21) Appl. No.: 17/557,396

(22) Filed: Dec. 21, 2021

(65) Prior Publication Data
US 2022/0194165 A1 Jun. 23, 2022

Related U.S. Application Data

(60) Provisional application No. 63/195,484, filed on Jun. 1, 2021, provisional application No. 63/129,307, filed on Dec. 22, 2020.

(51) Int. Cl.
*B60H 3/00* (2006.01)
*B60H 1/00* (2006.01)
(Continued)

(52) U.S. Cl.
CPC ..... *B60H 1/00278* (2013.01); *B60H 1/00392* (2013.01); *B60H 1/00885* (2013.01);
(Continued)

(58) Field of Classification Search
CPC ............ B60H 1/00278; B60H 1/00392; B60H 1/00885; B60H 1/034; B60L 58/27;
(Continued)

(56) References Cited

U.S. PATENT DOCUMENTS

| 2006/0048984 A1* | 3/2006 | Pleune | B60K 11/04 180/68.4 |
| 2020/0018222 A1* | 1/2020 | Tholander | B60H 1/323 |

FOREIGN PATENT DOCUMENTS

| CN | 102290618 | 11/2013 |
| CN | 106898841 | 7/2019 |

(Continued)

OTHER PUBLICATIONS

PCT; International Search Report and Written Opinion dated Mar. 4, 2022 in Application No. PCT/US2021/064685.

*Primary Examiner* — Davis D Hwu
(74) *Attorney, Agent, or Firm* — Snell & Wilmer L.L.P.

(57) ABSTRACT

An electric vehicle has a thermal management system that comprises a common radiator, a brake resistor loop, and an electric power source loop. The brake resistor loop comprises a brake resistor and a brake resistor controller that are coupled to the common radiator. The electric power source loop comprises an electric power source coupled to the common radiator. When the brake resistor loop is determined to be in operation, the common radiator is utilized by the brake resistor loop to absorb heat generated by the brake resistor loop. When the brake resistor loop is determined to not be in operation, the common radiator is utilized by the electric power source to absorb heat generated by the electric power source loop.

16 Claims, 4 Drawing Sheets

(51) Int. Cl.
    *B60L 58/12*     (2019.01)
    *B60L 58/27*     (2019.01)
    *B60L 58/26*     (2019.01)
    *B60H 1/03*     (2006.01)

(52) U.S. Cl.
    CPC .............. *B60H 1/034* (2013.01); *B60L 58/12* (2019.02); *B60L 58/26* (2019.02); *B60L 58/27* (2019.02); *B60L 2240/425* (2013.01); *B60L 2240/545* (2013.01)

(58) Field of Classification Search
    CPC .... B60L 58/12; B60L 58/26; B60L 2240/425; B60L 2240/545
    USPC .......................................................... 165/43
    See application file for complete search history.

(56) References Cited

FOREIGN PATENT DOCUMENTS

| | | | |
|---|---|---|---|
| CN | 111430846 | 7/2020 | |
| DE | 19545447 | 6/1997 | |
| DE | 102017113102 A1 * | 12/2017 | ......... B60H 1/00278 |
| KR | 19980041574 | 9/1998 | |

* cited by examiner

VEHICLE THERMAL MANAGEMENT SYSTEMS AND METHODS

CROSS-REFERENCE TO RELATED APPLICATIONS

This application claims priority to, and the benefit of, U.S. Provisional Patent Application No. 63/129,307 filed on Dec. 22, 2020 and entitled "Thermal Management System and Method Using a Common Radiator." This application also claims priority to, and the benefit of, U.S. Provisional Patent Application No. 63/195,484 filed on Jun. 1, 2021 and entitled "Vehicle Thermal Management Systems and Methods." The disclosure of the foregoing applications is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to thermal management systems, and more particularly, to thermal management systems for vehicles with electric power sources.

BACKGROUND

Alternative fuel vehicles such as battery electric vehicles (BEV) and fuel cell electric vehicles (FCEV) utilize electric drive trains, in contrast to traditional petroleum or diesel-powered drive trains. For example, the electricity provided by a battery pack or generated by a fuel cell stack may be used to power one or more electric motors to drive the vehicle's wheels and to power multiple other electrically operated systems of the vehicle. Traditionally, waste heat from the fuel cell stack and/or battery is captured by a coolant and routed to a radiator, thereby removing the waste heat from the system by releasing it to the ambient environment. Accordingly, approaches which utilize this waste heat in alternative ways to increase system thermal efficiency and increase vehicle lifespan and performance may be desirable.

SUMMARY

In an exemplary embodiment, an electric vehicle having a thermal management system comprises a common radiator, a brake resistor loop comprising at least one brake resistor and a brake resistor controller thermally coupled to the common radiator, and an electric power source loop comprising at least one electric power source thermally coupled to the common radiator. When the brake resistor is determined to be in operation, the common radiator may be configured to absorb heat generated by the brake resistor. In various embodiments, when the brake resistor is determined to not be in operation, the common radiator may be configured to absorb heat generated by the electric power source.

In another exemplary embodiment, a method for thermal management of an electric vehicle comprises: determining if a brake resistor comprised within the vehicle is in operation, wherein the vehicle further comprises a common radiator and at least one battery pack; when the brake resistor is in operation, utilizing the common radiator to cool the brake resistor; and when the brake resistor is not in operation, utilizing the common radiator to cool the at least one battery pack.

In another exemplary embodiment, a thermal management system comprises: a common radiator; a brake resistor coupled to the common radiator; three battery packs, wherein each battery pack is coupled in parallel with at least one other battery back, and wherein each of the three battery packs are coupled to the common radiator; and a refrigeration system coupled to the three battery packs. When the brake resistor is determined to be in operation, the common radiator absorbs heat generated by the brake resistor, and the refrigeration system absorbs heat generated by the three battery packs. When the brake resistor is determined to not be in operation, the common radiator absorbs heat generated by the three battery packs.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step.

Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with electric vehicles, fuel cell electric vehicles, compressed natural gas (CNG) vehicles, hythane (mix of hydrogen and natural gas) vehicles, and/or the like. However, various aspects of the disclosed embodiments may be adapted for performance in a variety of other systems. Further, in the context of the present disclosure, methods, systems, and articles may find particular use in any system requiring use of a battery, fuel cell, and/or thermal management system of the same. As such, numerous applications of the present disclosure may be realized.

Electric vehicles may generate large amounts of waste heat through the operation of various system components. For example, battery systems may generate waste heat as a result of enthalpy changes and resistive heating inside of battery cells, among other reasons. This additional heat may negatively affect consistent operation of a battery, which in turn may reduce the operational life of the battery. Further, although fuel cells often operate at higher temperatures than battery systems, the heat generated by the fuel cell may negatively impact operation of other components of the vehicle. By increasing the thermal efficiency of the thermal management system, certain components of the thermal management system may require less power from on-board batteries. As a result, battery capacity may be preserved and instead be utilized for other desirable purposes, for example to increase vehicle range.

Figure 1:
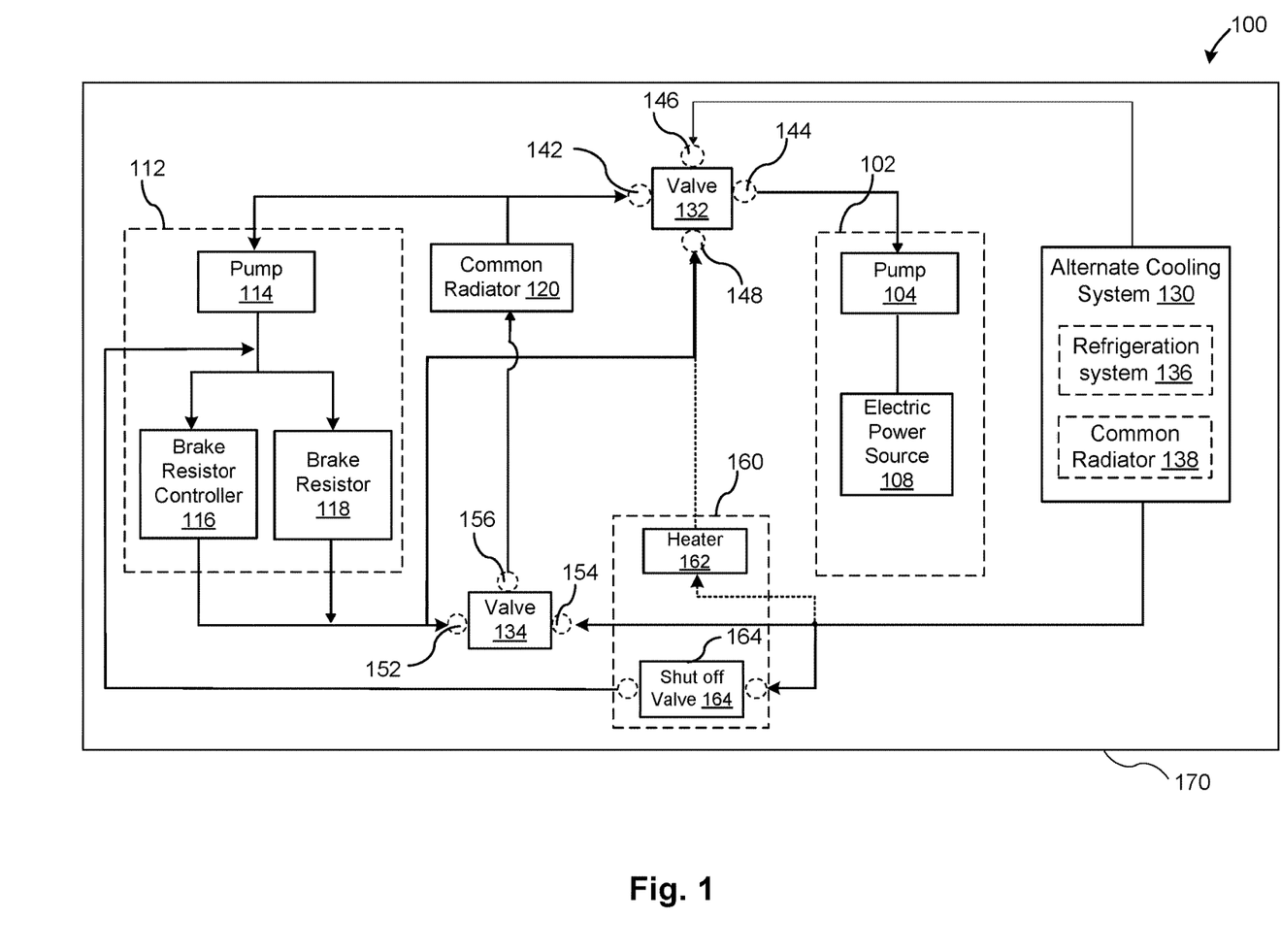
FIG. 1 illustrates a block diagram of an example thermal management system in a vehicle, in accordance with various embodiments.

FIG. 1 illustrates an exemplary embodiment of a thermal management system 170. In various embodiments, a vehicle 100 comprises and/or is configured with thermal management system 170. Vehicle 100 may comprise, for example, a battery electric vehicle. In various embodiments, vehicle 100 is a fuel cell electric vehicle. Thermal management system 170 may include a brake resistor loop 112, an electric power source loop 102, and at least one common radiator 120.

Brake resistor loop 112 may comprise at least one brake resistor 118. In various embodiments, brake resistor loop 112 may comprise multiple brake resistors 118. In further embodiments, multiple brake resistors 118 are coupled in a parallel configuration. In various embodiments, brake resistor(s) 118 are required to operate when one or more batteries comprised in electric power source 108 is fully charged. For example, when vehicle 100 is decelerating, regenerative braking may be used. One or more batteries of vehicle 100 are charged using regenerative braking power. When one or more batteries are fully charged, but vehicle 100 is still decelerating, regenerative braking may no longer be used and brake resistor(s) 118 may be used instead for braking.

Brake resistor loop 112 may further comprise a brake resistor controller 116 that is configured to control operation of brake resistor 118. In various embodiments, brake resistor 118 comprises a built-in brake resistor controller 116. In other embodiments, brake resistor controller 116 is external to brake resistor 118. In further embodiments, brake resistor controller 116 and brake resistor 118 are thermally coupled to each other in a parallel configuration.

During certain events, such as deceleration of vehicle 100, brake resistor loop 112 may utilize and/or absorb significant amounts of electrical energy, which is at least partially converted into heat. Further, in various embodiments, vehicle 100 may need to decelerate while driving down a slope, increasing the heat generated in brake resistor loop 112. In order to maintain a temperature of brake resistor loop 112 within a desired range, heat is dissipated by circulating a coolant through brake resistor loop 112 and common radiator 120. In various embodiments, common radiator 120 may comprise a fan configured to assist in convective heat transfer to an external environment. The flow of the coolant circulating through brake resistor loop 112 may be further enhanced by pump 114, which may be thermally coupled in series with brake resistor controller 116 and brake resistor 118. In such embodiments, when brake resistor loop 112 is in operation, the coolant flows through brake resistor loop 112 and common radiator 120.

As discussed herein, two components may be considered "thermally coupled" when thermal energy from one or both components may be transferred into a common cooling fluid, or vice versa. For example, a coolant pumped by pump 114 may be split to circulate through both brake resistor controller 116 and brake resistor 118 before the coolant combines to flow through outlets 152 and 156. Thus, thermal energy from both brake resistor controller 116 and brake resistor 118 is now transferred into this coolant and brake resistor controller 116 and brake resistor 118 may be considered "thermally coupled." Further, the coolant from brake resistor loop 112 may then circulate through common radiator 120 via outlets 152 and 156. Thus, because brake resistor loop 112 and common radiator 120 are connected via a coolant loop path, they may be considered "thermally coupled."

In various embodiments, electric power source loop 102 is also thermally coupled to common radiator 120. Electric power source loop 102 comprises at least one electric power source 108 and at least one pump 104. In various embodiments, electric power source 108 comprises one or more fuel cells. Electric power source 108 may comprise one or more battery systems, including in combination with one or more fuel cells. In various embodiments, electric power source loop 102 is further thermally coupled to an alternate cooling system 130. Alternate cooling system 130 may comprise, for example a second radiator 138, a refrigeration system 136, or any other suitable cooling system.

In various embodiments, when electric power source loop 102 is in operation, and when brake resistor loop 112 is not in operation, to maintain the temperature of the electric power source 108 in a desired temperature range, heat generated in electric power source 108 may be dissipated by circulating a coolant through the electric power source loop 102 and common radiator 120. When electric power source loop 102 is in operation, and when brake resistor loop 112 is also in operation, heat generated in electric power source 108 may be dissipated by circulating the coolant through electric power source loop 102 and alternate cooling system 130.

In various embodiments, common radiator 120 is thermally coupled to a first valve 132 and a second valve 134. First valve 132 may be a 3-way valve or a 4-way valve, for example. In various examples, second valve 134 may be a 3-way valve. In various embodiments, first valve 132 is further thermally coupled to brake resistor loop 112, and brake resistor loop 112 is further thermally coupled to second valve 134. Similarly, first valve 132 and second valve 134 may be thermally coupled to electric power source loop 102. First valve 132 and second valve 134 may assist in preventing the coolant from brake resistor loop 112 from flowing through electric power source loop 102, and in preventing the coolant from electric power source loop 102 from flowing through brake resistor loop 112.

In various embodiments, when brake resistor 118 is in operation and electric power source 108 is not in operation, thermal management system 170 is in brake resistor mode. When thermal management system 170 is in brake resistor mode, second valve 134 is configured to open outlets 152 (facing brake resistor loop 112) and 156 and close outlet 154 (facing electric power source loop 102). In such embodiments, first valve 132 is configured to close at least outlet 142. Accordingly, the coolant circulating through brake resistor loop 112 does not flow through electric power source loop 102 in these configurations.

In various embodiments, when electric power source 108 is in operation and brake resistor loop 112 is not in operation, thermal management system 170 is in electric power source mode. When thermal management system 170 is in electric power source mode, second valve 134 is configured to open outlets 154 and 156 and close outlet 152. In such embodiments, first valve 132 is configured to open outlets 142 (facing common radiator 120) and 144 (facing electric power source loop 108) and close outlet 146 (facing alternate cooling system 130). Accordingly, the coolant circulating through electric power source loop 102 does not flow through brake resistor loop 112 or through alternate cooling system 130 in these configurations.

In various embodiments, when electric power source 108 and brake resistor 118 are in operation, thermal management system 170 is in alternate cooling mode. When thermal management system 170 is in alternate cooling mode, second valve 134 is configured to open outlets 152 and 156 but keep outlet 154 closed, and first valve 132 is configured to open outlets 146 and 144 but keep outlet 142 closed. Thus, the coolant circulating through the brake resistor loop 112 flows through common radiator 120, but the coolant circulating through electric power source loop 102 does not flow through common radiator 120 or brake resistor loop 112. Instead, the coolant from electric power source loop 102 circulates through alternate cooling system 130 and electric power source loop 102 to dissipate heat generated by operation of electric power source 108.

In various embodiments, first valve 132 is a 4-way valve. Valve 132 may be thermally coupled to heating sub-system 160 at outlet 148. In various embodiments, when the ambient temperature is less than a first temperature threshold, thermal management system 170 operates in a heater mode. In the heater mode, first valve 132 is configured to open outlets 148 and 144, and further configured to close outlets 142 and 146 such that the coolant flowing through electric power source loop 102 is circulated through heating sub-system 160 to pre-heat one or more batteries comprised in electric power source loop 102 but prevents the coolant from flowing through brake resistor loop 112. In such embodiments, second valve 134 is configured to close outlets 152, 154, and 156 to prevent the coolant flowing from electric power source loop 108 from flowing through common radiator 120. In various embodiments, valve 134 has a shut-off function.

In various exemplary embodiments, the first temperature threshold is within a range of about 0 degrees Celsius to 20 degrees Celsius. In further exemplary embodiments, the first temperature threshold is within a range of 0 degrees to 15 degrees Celsius. In some exemplary embodiments, the first temperature threshold is 0 degrees Celsius or less. In various embodiments, one or more batteries comprised in electric power source loop 102 are pre-heated when vehicle 100 is started. For example, one or more batteries may be heated prior to operation of electric power source 108.

In various embodiments, heating sub-system 160 comprises a shut-off valve 164. Shut-off valve 164 is thermally coupled to electric power source loop 102 and to brake resistor loop 112. In various embodiments, when the ambient temperature is less than a first temperature threshold, shut-off valve 164 and brake resistor loop 112 may be used to pre-heat one or more batteries comprised in electric power source loop 102. When brake resistor 118 is operating, heat is generated in brake resistor loop 112. When an ambient temperature is less than a first temperature threshold, this heat generated in brake resistor loop 112 may be utilized to pre-heat one or more batteries comprised in electric power source loop 102.

For example, in the heating mode, shut-off valve 164 may be opened to allow the coolant flowing from electric power source loop 102 to be circulated through at least a part of the brake resistor loop 112. Because all outlets of valve 134 are closed, the coolant flowing from electric power source loop 102 does not circulate through common radiator 120. Further, brake resistor loop 112 may be thermally coupled to valve 132 at outlet 148. Outlets 148 and 144 of valve 132 are configured to be open in the heating mode and the heated coolant flowing from brake resistor loop 112 may then be circulated through electric power source loop 102 via valve 132 to pre-heat one or more batteries comprised in electric power source loop 102. Again, because all outlets of valve 134 are closed, the heated coolant flowing from brake resistor loop 112 does not circulate through common radiator 120.

In various embodiments, heating sub-system 160 comprises an auxiliary heater 162. Heater 162 may be thermally coupled to valve 132 at outlet 148 and may further be used to pre-heat one or more batteries comprised in electric power source loop 102. For example, the coolant flowing from electric power source loop 102 may be circulated through heater 162. This heated coolant may then be circulated back to electric power source loop 102 via valve 132 to pre-heat one or more batteries comprised in electric power source loop 102.

In various embodiments, when heater 162 is used to pre-heat one or more batteries comprised in electric power source loop 102, shut-off valve 164 is closed such that the coolant from electric power source loop 102 does not circulate through brake resistor loop 112. In various embodiments, both heater 162 and brake resistor 118 may be utilized to pre-heat one or more batteries comprised in electric power source loop 102.

As discussed herein, an "outlet" may be any orifice or cavity that enables fluid connection between two components. For example, coolant flowing from brake resistor loop 112 flows into outlet 152 and flows out of outlet 156 to circulate through common radiator 120. Thus, 152 and 156 are both considered "outlets" because they enable fluid connection between brake resistor loop 112 and common radiator 120.

Figure 2:
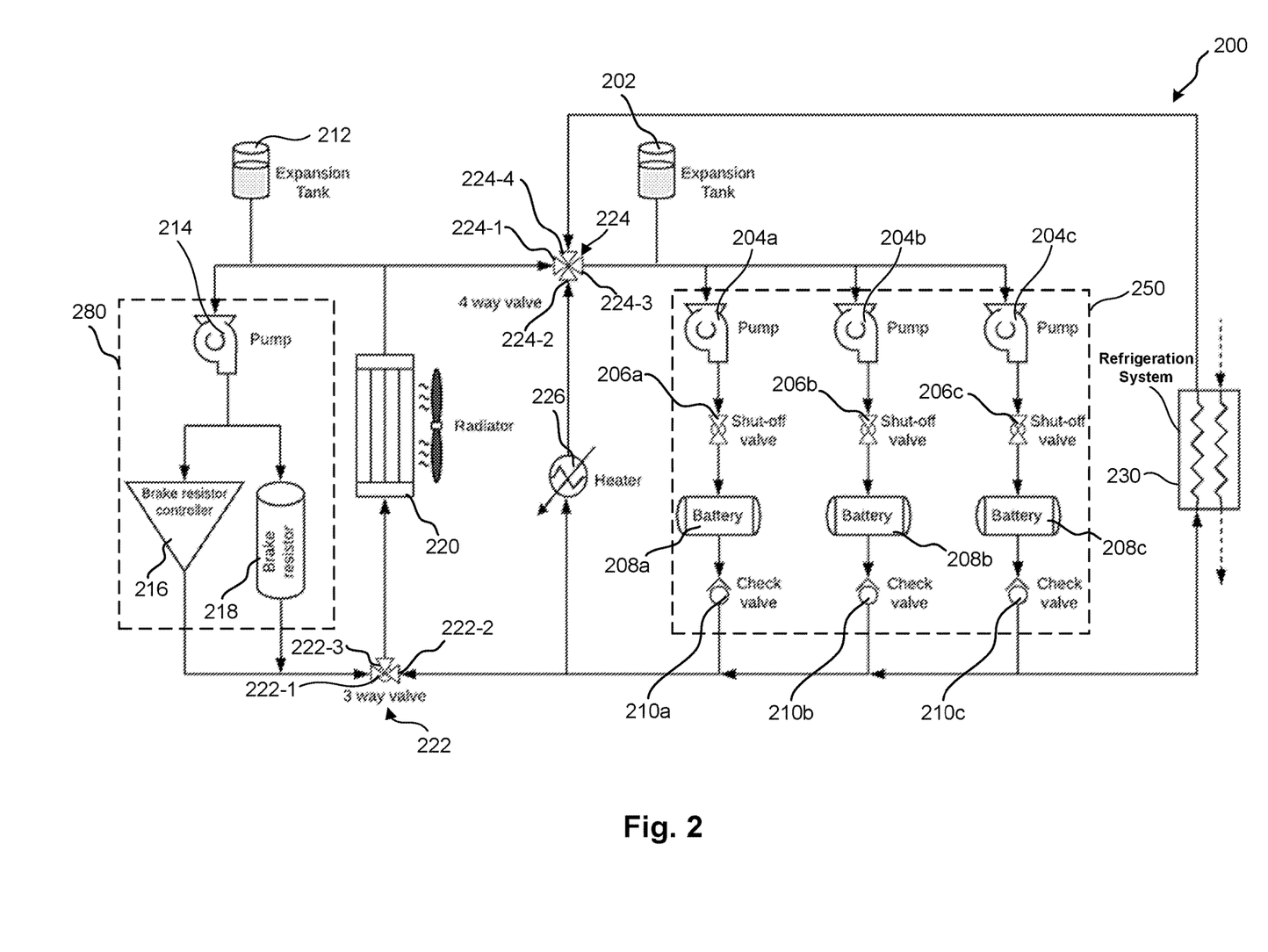
FIG. 2 illustrates a block diagram of an example battery electric vehicle thermal management system, in accordance with various embodiments.

With reference now to FIG. 2, a thermal management system 200 for a battery electric vehicle (BEV) in accordance with the present disclosure is illustrated. In various embodiments, thermal management system 200 includes a brake resistor (BR) pump 214 thermally coupled to brake resistor (BR) controller 216 and at least one brake resistor (BR) 218. BR controller 216 and BR 218 may be thermally coupled in parallel with each other. Accordingly, in various embodiments, when BR 218 is in operation, to dissipate heat generated in BR 218, a coolant from brake resistor (BR)

expansion tank 212 is pumped by BR pump 214 and circulated through BR controller 216 and BR 218. In various embodiments, BR 218 may be in operation when a vehicle comprising thermal management system 200 is driving down a slope. Thermal management system 200 may further comprise, for example, a first valve 222 having outlets 222-1 (facing BR 218), 222-2 (facing battery loop 250) and 222-3 (facing common radiator 220). In such configurations, when BR 218 is in operation, first valve 222 is configured to open outlets 222-1 and 222-3, which allows coolant circulating through the brake resistor loop 280 to flow through common radiator 220 and blocks any other coolant from flowing through common radiator 220. Accordingly, common radiator 220 is operable to cool BR controller 216 and/or BR 218 (but not other components of vehicle 100) when BR 218 is in operation.

Thermal management system 200 may further comprise, for example, a battery loop 250 comprising one or more batteries 208 thermally coupled to common radiator 220. One or more batteries 208 may also be thermally coupled to a refrigeration system 230. In various embodiments, thermal management system 200 includes a second valve 224, which may be a 3-way or a 4-way valve. Second valve 224 may be thermally coupled to battery loop 250 at outlet 224-3, thermally coupled to common radiator 220 at outlet 224-1, and thermally coupled to refrigeration system 230 at outlet 224-4.

When BR 218 is not in operation, common radiator 220 may be used by battery loop 250 to dissipate heat generated in one or more batteries 208. In various embodiments, when the ambient temperature is greater than a second temperature threshold, one or more batteries 208 may utilize common radiator 220 to dissipate heat generated by one or more batteries 208. For example, the second temperature threshold may be in a range of about 20 degrees Celsius to 40 degrees Celsius. In further examples, the second temperature threshold may be in a range of about 25 degrees Celsius to 35 degrees Celsius. In even further examples, the second temperature threshold may be 30 degrees Celsius. Battery loop 250 may, for example, be coupled to at least one pump 204. In various embodiments, all batteries in battery loop 250 are coupled to a single pump 204. In other embodiments, one or more batteries 208 (such as batteries 208a, 208b and 208c) are thermally coupled to a separate pump, such as pumps 204a, 204b and 204c, respectively.

When BR 218 is not in operation and when one or more batteries 208 are operating, to dissipate heat generated in batteries 208 a coolant from battery expansion tank 202 may be pumped by one or more battery pump(s) 204 and circulated through batteries 208. In various embodiments, when BR 218 is not operating and when one or more batteries 208 are operating, first valve 222 is configured to open outlets 222-2 and 222-3 to allow coolant circulating through battery loop 250 to flow through common radiator 220. First valve 222 may be configured to close outlet 222-1 so that common radiator 220 is not utilized by BR 218 while it is being utilized by battery loop 250. Further, second valve 224 may be configured to open at outlets 224-1 and 224-3 so that the coolant can flow through common radiator 220 and battery loop 250 to dissipate heat generated in one or more batteries 208. In various embodiments, when battery loop 250 is utilizing common radiator 220, refrigeration system 230 may not be utilized for dissipating heat generated in one or more batteries 208. Accordingly, second valve 224 may be configured to close outlet 224-2 coupled to refrigeration system 230.

When BR 218 is in operation and when one or more batteries 208 are in operation, common radiator 220 may be utilized by BR 218 and BR controller 216 to dissipate heat generated by BR 218. In various embodiments, both BR 218 and one or more batteries 208 may be in operation when vehicle 100 is driving down a slope. First valve 222 may be configured to open outlets 222-1 and 222-3 to allow coolant circulating through brake resistor loop 280 to flow through common radiator 220, and further configured to close outlet 222-2 to stop coolant circulating through battery loop 250 from flowing through common radiator 220.

In various embodiments, when the ambient temperature is greater than the second temperature threshold one or more batteries 208 may also require cooling. For example, the second temperature threshold may be within a range of 25 degrees Celsius and 35 degrees Celsius. In a further example, the second temperature threshold is 30 degrees Celsius. Because the common radiator 220 is utilized by BR loop 212 for cooling, battery loop 250 may utilize refrigeration system 230 to dissipate heat generated by one or more batteries 208. Accordingly, second valve 224 may be configured to open outlets 224-4 and 224-3 to allow coolant circulating through battery loop 250 to flow through refrigeration system 230, and further configured to close outlet 224-1 to stop coolant flowing out of common radiator 220 from flowing through battery loop 250. Thus, when common radiator 220 is used by BR 218, heat generated in batteries 208 may be dissipated using refrigeration system 230.

In various embodiments, second valve 224 is a 4-way valve. Valve 224 may, for example, be thermally coupled to a heater 226 at outlet 224-2. In various embodiments, when the ambient temperature is less than a first temperature threshold, second valve 224 is configured to open outlet 224-2 and outlet 224-4, and configured to close outlets 224-1 and 224-3 such that coolant flowing through battery loop 250 is circulated through heater 226 to pre-heat one or more batteries 208. For example, the first temperature threshold may be in an approximate range of 0 degrees Celsius to 20 degrees Celsius. In further examples, batteries 208 may be pre-heated when the ambient temperature is less than 0 degrees Celsius. In such embodiments, first valve 222 may be configured to close at least outlet 222-2 to prevent coolant flowing through battery loop 250 from flowing through common radiator 220. In various embodiments, one or more batteries 208 are pre-heated when vehicle 100 is started. For example, one or more batteries may be pre-heated prior to operation of brake resistor 218 or one or more batteries 208.

Battery loop 250 may comprise, for example, three batteries 208a, 208b, and 208c. However, battery loop 250 may comprise any suitable number of batteries 208, such as two batteries 208, four batteries 208, six batteries 208, nine batteries 208, and/or the like. Batteries 208a, 208b, and 208c are further coupled to pumps 204a, 204b, and 204c, respectively, via shut off valves 206a, 206b, and 206c, respectively. In various embodiments, based on operational needs of vehicle 100, only some of the batteries 208 may be in operation. For example, battery 208a and battery 208b may be configured to operate while battery 208c may be configured to disconnect. In such embodiments, shut-off valve 206c may be configured to close its respective outlets such that the coolant circulating through battery loop 250 does not flow through battery 208c, causing the coolant circulating through battery loop 250 to instead flow only through batteries 208a and 208b. Similarly, if battery 208a and/or battery 208b are disconnected, shut-off valves 206a and/or 206b may similarly be configured to close their corresponding outlets and restrict the coolant from flowing through the disconnected batteries.

Further, battery loop 250 may include at least one check valve 210 configured to maintain the circulation of the coolant flowing out of battery loop 250 and direct it through one of common radiator 220 or refrigeration system 230 such that it may thereafter circulate back through battery loop 250. In exemplary embodiments, each battery 208 (such as 208a, 208b, and 208c) is coupled to an individual check valve 210 (such as 210a, 210b, and 210c, respectively).

In various embodiments, cooling objectives for one or more batteries 208 and brake resistor(s) 218 may be different. For example, one or more batteries 208 may be desired to maintain a temperature within a range of about 25° C. and about 40° C. for efficient operation, and brake resistor(s) 218 may be desired to maintain a temperature within a range of about 75° Celsius and about 95° Celsius for efficient operation.

Figure 3:
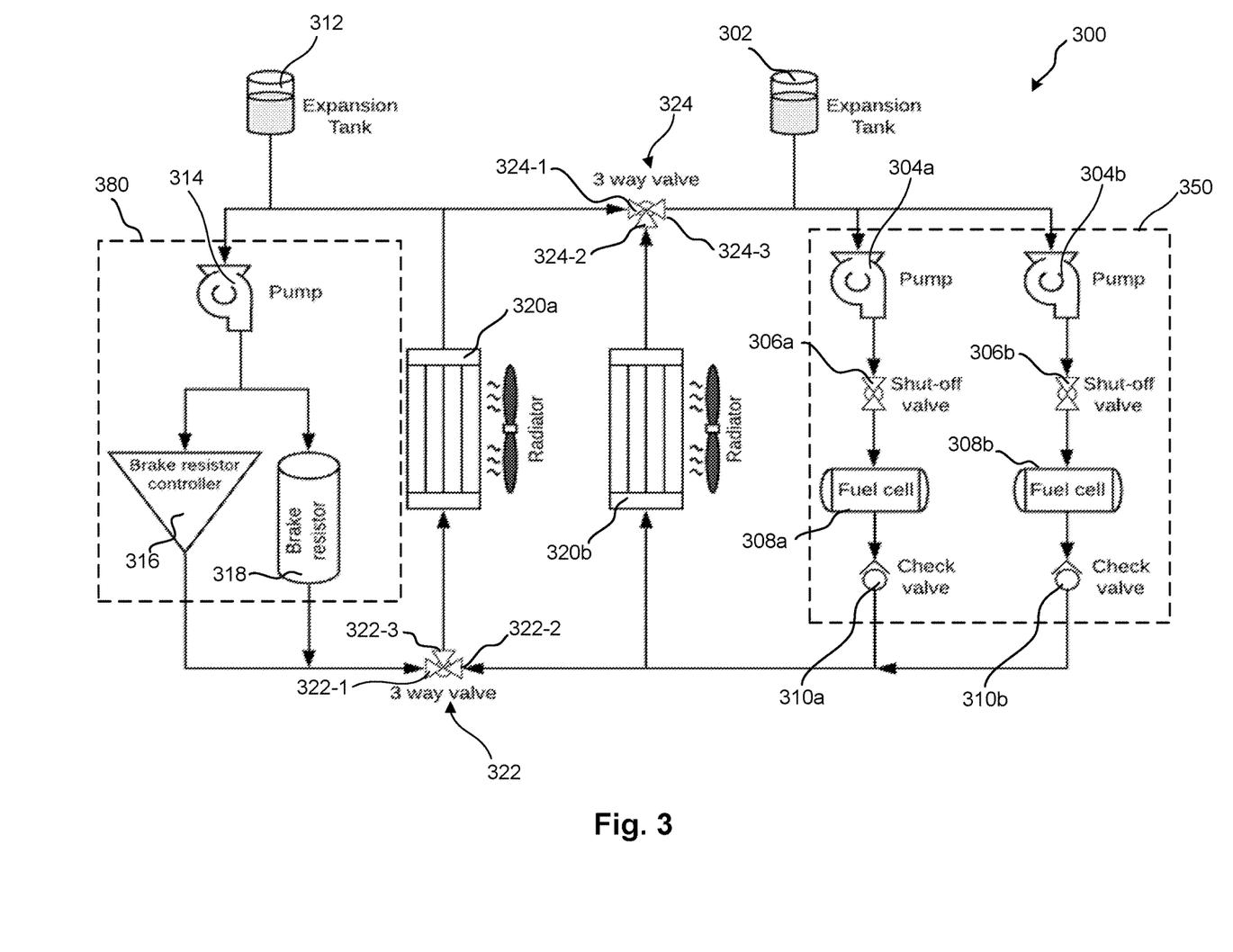
FIG. 3 illustrates a block diagram of an example fuel cell electric vehicle thermal management system, in accordance with various embodiments.

With reference now to FIG. 3, a thermal management system 300 for a fuel cell electric vehicle (FCEV) in accordance with the present disclosure is illustrated. In various embodiments, thermal management system 300 includes a brake resistor (BR) loop 380 that may further comprise a brake resistor (BR) pump 314 thermally coupled to brake resistor (BR) controller 316 and at least one brake resistor (BR) 318. BR controller 316 and BR 318 may, for example, be thermally coupled to each other in a parallel configuration. Thermal management system 300 may further comprise at least one fuel cell loop 350. In various embodiments, fuel cell loop 350 comprises one or more fuel cells 308 (such as 308a and 308b) thermally coupled to pump 304. For example, each of fuel cells 308 may be thermally coupled to a single pump 304, or each individual fuel cell 308a and 308b may be coupled to a separate pump 304a and 304b, respectively. Shut-off valves 306a, 306b may be disposed between respective pumps 304a, 304b and fuel cells 308a, 308b, and check valves 310a, 310b may be disposed on the other side of fuel cells 308a, 308b respectively.

Thermal management system 300 may further include at least two radiators 320a and 320b, each of which may be thermally coupled to fuel cell loop 350. Further, at least one of the two radiators 320 may also be thermally coupled to BR loop 380. In various embodiments, thermal management system 300 further includes a first 3-way valve 322 coupled to BR loop 380 at outlet 322-1, coupled to fuel cell loop 350 at outlet 322-2, and coupled to first radiator 320a at outlet 322-3. Further, thermal management system 300 may include a second 3-way valve 324 coupled to first radiator 320a at outlet 324-1, coupled to second radiator 320b at outlet 324-2, and coupled to fuel cell loop 350 at outlet 324-3.

When one or more fuel cells 308 are in operation, to dissipate heat generated by fuel cell 308, first radiator 320a and/or second radiator 320b may be utilized by fuel cell loop 350. In various embodiments, coolant from fuel cell (FC) expansion tank 302 is pumped by at least one FC pump 304 and circulated through one or more fuel cells 308. In various embodiments, both radiators 320a and 320b may be utilized by fuel cell (FC) loop 350 to dissipate heat generated by one or more fuel cells 308. In such embodiments, first valve 322 is configured to open outlets 322-2 and 322-3 to allow coolant circulating through FC loop 350 to flow through first radiator 320a. First valve 322 may be configured to close outlet 322-1 coupled with BR loop 380, preventing coolant from flowing to or from BR loop 380. Further, second valve 324 may be configured to open all three outlets 324-1, 324-2, and 324-3. In such embodiments, coolant flowing through first radiator 320a may flow back through FC loop 350 via outlets 324-1 and 324-3. Further, the coolant may also flow through second radiator 320b. The coolant flowing through second radiator 320b may flow back through FC loop 350 via outlets 324-2 and 324-3.

In various embodiments, when one or more fuel cells 308 are in operation, a single radiator may be utilized to dissipate heat generated by one or more fuel cells 308. In such embodiments, after the coolant has circulated through one or more fuel cells 308, the coolant flows through either first radiator 320a or second radiator 320b. Accordingly, first valve 322 may be configured to open outlet 322-2 and 322-3 and close outlet 322-1, and second valve 324 may be configured to open outlet 324-1 and 324-3 and close outlet 324-2. Thus, the coolant may only be circulated through first radiator 320a (and not through second radiator 320b). Alternatively, in various embodiments, the coolant from fuel cells 308 may not circulate via first valve 322. For example, first valve 322 may be configured to close its outlets 322-1, 322-2, and 322-3, and second valve 324 is configured to open outlets 324-2 and 324-3 and close outlet 324-1. Thus, the coolant is circulated only through second radiator 320b (and not through first radiator 320a).

When BR 318 is in operation, to dissipate heat generated in BR 318, a coolant may be pumped by BR pump 314 and circulated through BR loop 380. In exemplary embodiments, the coolant is pumped by BR pump 314 from BR expansion tank 312. In various embodiments, BR 318 may be in operation when vehicle 100 is driving down a slope, and the coolant from the BR loop 380 may be circulated through at least one radiator 320. First valve 322 may, for example, be configured to open outlet 322-1 and 322-3 and close outlet 322-2, allowing coolant flowing from BR loop 380 and circulate through first radiator 320a while preventing other coolant from flowing through first radiator 320a. Further, second valve 324 is configured to close outlet 324-1, allowing coolant flowing through first radiator 320a to circulate back through BR loop 380 (and not circulate through FC loop 350).

When, along with BR 318, one or more fuel cells 308 are also in operation, second radiator 320b may be utilized by FC loop 350 to dissipate heat generated in one or more fuel cells 308. In such embodiments, second valve 324 is configured to open outlet 324-2 and 324-3 to allow the coolant circulating from the FC loop 350 to flow through second radiator 320b and back through FC loop 350. Because outlets 322-2 and 324-1 are closed, the coolant flowing through FC loop 350 does not circulate through first radiator 320a and the coolant flowing through BR loop 380 does not flow in FC loop 350. Thus, based on operational needs of vehicle 100, first radiator 320a may be utilized by either BR loop 380 or FC loop 350.

Figure 4:
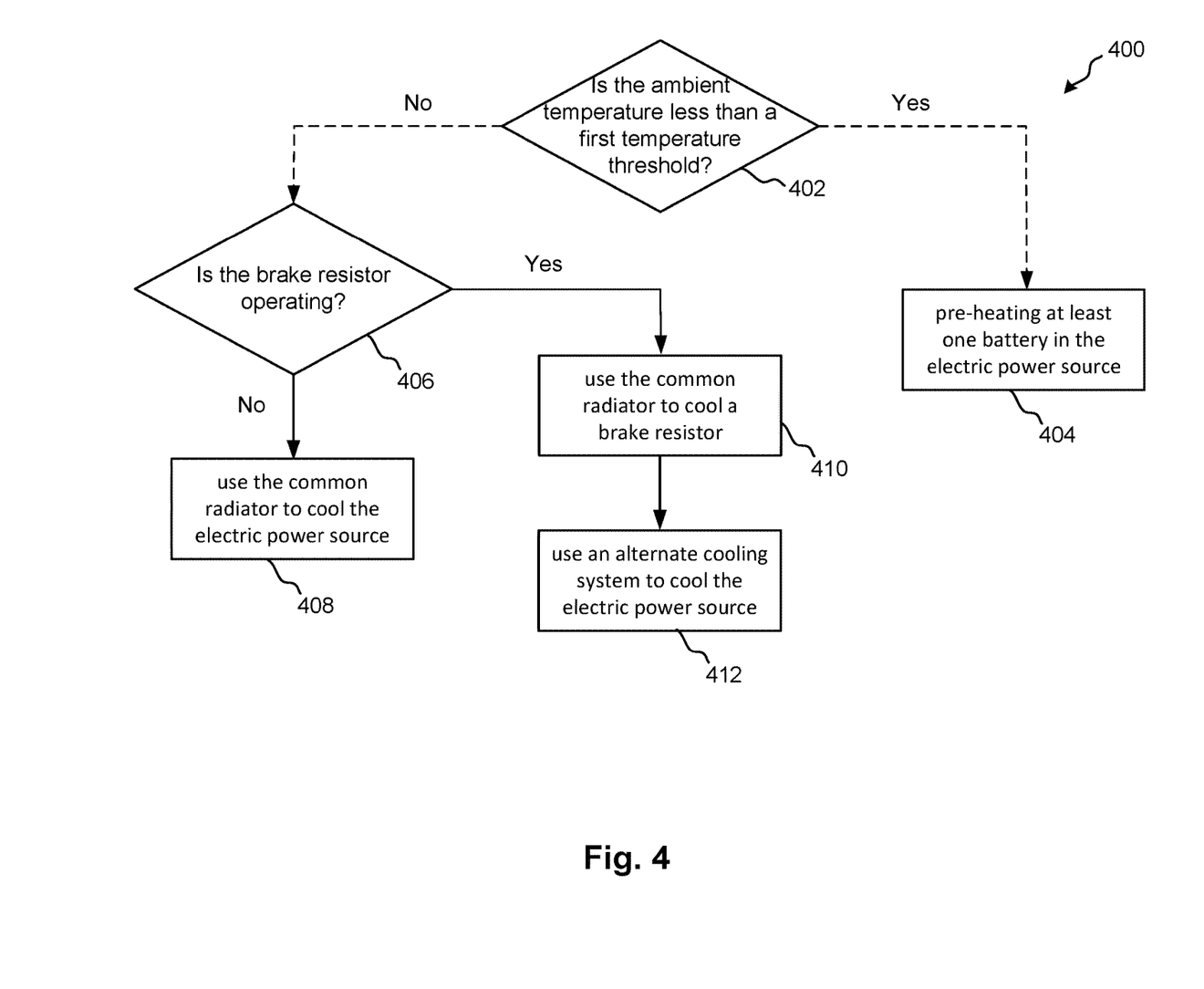
FIG. 4 illustrates a flow diagram of an example method of utilizing a common radiator for thermal management in a vehicle.

With reference now to FIG. 4, a method 400 of utilizing a common radiator for thermal management in a vehicle in accordance with the present disclosure is illustrated. Method 400 may be implemented by vehicle thermal management systems described herein. A first step of method 400 comprises determining if a brake resistor within a vehicle, such as one comprising thermal management system 170, is in operation (step 406). When a vehicle is in operation, method 400 may further comprise a step of using a common radiator to cool the brake resistor, such as brake resistor 118 (step 410). When the brake resistor is not in operation, method 400 may further comprise a step of using a common radiator to cool an electric power source, such as power source 108 (step 408). In various embodiments, the electric power source comprises one or more batteries. In various embodiments, the electric power source comprises at least one fuel cell.

In various embodiments of method 400, prior to determining if the brake resistor is in operation, method 400 may further comprise a step of determining if an ambient temperature is less than a first temperature threshold (step 402). In various embodiments, the first temperature threshold may be in a range of 0 degrees Celsius and 15 degrees Celsius. In various embodiments, the first temperature threshold may be 0 degrees Celsius. When the ambient temperature is less than a first temperature threshold, method 400 may further comprise a step of pre-heating at least one battery comprised in the electric power source (step 404). For example, when the vehicle is started, the ambient temperature may be less than a first temperature threshold. In such an event, a heating component may be used to pre-heat at least one battery comprised in the electric power source prior to operation of the brake resistor. In various embodiments, the heating component may be a heater. In various embodiments, the heating component may be the brake resistor. The heating component as described herein is a device that generates heat absorbed by coolant flowing from an electric power source loop, such as electric power source loop 102.

In various embodiments, responsive to a determination that the brake resistor is in operation, method 400 further comprises determining if the electric power source is in operation. When the electric power source is in operation, method 400 comprises utilizing an alternate cooling system to cool the electric power source (step 412). In various embodiments, the step of utilizing a common radiator to cool an electric power source further comprises determining if the electric power source is in operation.

In various embodiments, wherein the electric power source comprises one or more batteries, method 400 further comprises a step of determining if an ambient temperature is greater than a second temperature threshold. When the ambient temperature is greater than a second temperature threshold, method 400 comprises a step of utilizing a refrigeration system to cool the one or more batteries. The second temperature threshold may be between 25 degrees Celsius and 35 degrees Celsius.

Principles of the present disclosure may be compatible and/or utilized in connection with principles set forth in U.S. Ser. No. 17/403,179 filed Aug. 16, 2021 entitled "High Voltage Electrical System for Battery Electric Vehicle" and/or with principles set forth in with U.S. Ser. No. 17/321,724 filed May 17, 2021, now U.S. Pat. No. 11,124,076 entitled "Electric Vehicle Battery Frame Assembly". The contents of the foregoing applications are incorporated herein by reference, but except for any subject matter disclaimers or disavowals, and except to the extent that the incorporated material is inconsistent with the express disclosure herein, in which case the language in this disclosure shall control.

EXAMPLE EMBODIMENTS

Example 1 includes a thermal management system for a vehicle, comprising: a common radiator; a brake resistor loop comprising at least one brake resistor and a brake resistor controller thermally coupled to the common radiator; and an electric power source loop comprising at least one electric power source thermally coupled to the common radiator, wherein when the brake resistor loop is determined to be in operation, the common radiator absorbs heat generated by the brake resistor loop.

Example 2 includes the thermal management system of Example 1, further comprising: an alternate cooling system thermally coupled to the electric power source loop, wherein when the brake resistor loop and the electric power source are determined to be in operation at the same time, the alternate cooling system absorbs heat generated by the electric power source loop.

Example 3 includes the thermal management system of any of Examples 1-2, wherein the electric power source loop further comprises at least one battery.

Example 4 includes the thermal management system of any of Examples 2-3, wherein the alternate cooling system comprises a refrigeration system.

Example 5 includes the thermal management system of any of Examples 3-4, wherein the electric power source loop comprises three batteries, and wherein each battery is thermally coupled in parallel with the other batteries.

Example 6 includes the thermal management system of any of Examples 1-5, wherein the electric power source loop further comprises at least one fuel cell.

Example 7 includes the thermal management system of Example 6, wherein the electric power source loop comprises two fuel cells, and wherein the two fuel cells are thermally coupled in parallel with one another.

Example 8 includes the thermal management system of any of Examples 1-7, further comprising a second radiator, wherein the second radiator is thermally coupled to the brake resistor loop and thermally coupled to the electric power source loop.

Example 9 includes the thermal management system of any of Examples 2-8, wherein the alternate cooling system comprises a second radiator.

Example 10 includes the thermal management system of any of Examples 3-9, wherein when ambient temperature is less than a first temperature threshold, heat generated by the brake resistor loop pre-heats the at least one battery.

Example 11 includes the thermal management system of any of Examples 3-10, wherein when ambient temperature is less than a first temperature threshold, heat generated by a heater pre-heats the at least one battery.

Example 12 includes a method of increasing thermal efficiency in a thermal management system of a vehicle, the method comprising: determining if a brake resistor comprised within the vehicle is in operation, wherein the vehicle further comprises a common radiator and an electric power source; when the brake resistor is in operation, utilizing the common radiator to cool the brake resistor; and when the brake resistor is not in operation, utilizing the common radiator to cool the electric power source.

Example 13 includes the method of Example 12, wherein prior to determining if the brake resistor in operation, the method further comprises: determining if an ambient temperature is less than a first temperature threshold; and when the ambient temperature is less than the first temperature threshold, utilizing a heater to pre-heat the electric power source.

Example 14 includes the method of any of Examples 12-13, wherein the first temperature threshold is between 0 degrees Celsius and 15 degrees Celsius.

Example 15 includes the method of any of Examples 12-14, wherein prior to determining if the brake resistor is in operation, the method further comprises: determining if an ambient temperature is less than a first temperature threshold; and when the ambient temperature is less than the first temperature threshold, pre-heating at least one battery comprised in the electric power source.

Example 16 includes the method of Example 15, wherein pre-heating at least one battery comprised in the electric power source further comprises utilizing a heater to pre-heat the at least one battery.

Example 17 includes the method of any of Examples 15-16, wherein when the brake resistor is in operation, pre-heating at least one battery comprised in the electric power source further comprises utilizing a brake resistor to pre-heat the at least one battery.

Example 18 includes the method of Example 17, wherein utilizing a brake resistor to pre-heat the at least one battery further comprises: circulating a coolant flowing from the electric power source through the brake resistor; and circulating the heated coolant back through the electric power source.

Example 19 includes the method of any of Examples 12-17, wherein responsive to a determination that the brake resistor is in operation, the method further comprises: determining if the electric power source is in operation; and when the electric power source is in operation, utilizing an alternate cooling system to cool the electric power source.

Example 20 includes the method of any of Examples 12-19, wherein the electric power source comprises one or more batteries.

Example 21 includes the method of Example 20, wherein responsive to a determination that the brake resistor is in operation, the method further comprises: determining if an ambient temperature is greater than a second temperature threshold; when the ambient temperature is greater than a second temperature threshold, utilizing a refrigeration system to cool the one or more batteries.

Example 22 includes the method of Example 21, wherein the second temperature threshold is between 25 degrees Celsius and 35 degrees Celsius.

Example 23 includes a thermal management system for a vehicle, comprising: one or more radiators; a brake resistor thermally coupled to at least one of the one or more radiators; one or more fuel cells thermally coupled to at least one of the one or more radiators; wherein when the brake resistor is determined to be in operation, the at least one radiator absorbs heat generated by the brake resistor; and wherein when the brake resistor is determined not to be in operation, the at least one radiator absorbs heat generated by the one or more fuel cells.

Example 24 includes the thermal management system of Example 23, further comprising: at least one 3-way valve, wherein the brake resistor is coupled to the 3-way valve, wherein the one or more fuel cells are coupled to the 3-way valve, and wherein at least one of the one or more radiators is coupled to a 3-way valve; and wherein when the brake resistor is determined to be in operation, the 3-way valve thermally couples the at least one radiator with the brake resistor; and wherein when the brake resistor is determined not to be in operation, the 3-way valve thermally couples the at least one radiator to the one or more fuel cells.

Example 25 includes the thermal management system of any of Examples 23-24, wherein the at least one radiator comprises a first radiator and a second radiator.

Example 26 includes the thermal management system of Example 25, wherein the first radiator is thermally coupled to the brake resistor, wherein the first radiator is thermally coupled to the one or more fuel cells, wherein the second radiator is thermally coupled to the one or more fuel cells, and wherein when the brake resistor is determined to be in operation, the first radiator absorbs heat generated by the brake resistor, and the second radiator absorbs heat generated by the one or more fuel cells.

Example 27 includes the thermal management system of Example 26, further comprising: a first 3-way valve, wherein the brake resistor is coupled to the first 3-way valve, wherein the one or more fuel cells are coupled to the first 3-way valve, and wherein the first radiator is coupled to the first 3-way valve; and wherein when the brake resistor is determined to be in operation, the first 3-way valve thermally couples the first radiator with the brake resistor; and wherein when the brake resistor is determined not to be in operation, the first 3-way valve thermally couples the first radiator to the one or more fuel cells.

Example 28 includes the thermal management system of Example 27, further comprising: a second 3-way valve, wherein the first radiator is coupled to the second 3-way valve, wherein the one or more fuel cells are coupled to the second 3-way valve, and wherein the second radiator is coupled to the second 3-way valve.

Example 29 includes the thermal management system of Example 28, wherein when the brake resistor is determined to be in operation, the second 3-way valve thermally couples the second radiator to the one or more fuel cells such that the second radiator absorbs heat generated by the one or more fuel cells.

Example 30 includes the thermal management system of Example 29, wherein when the brake resistor is determined to not be in operation, the first 3-way valve thermally couples the first radiator to the one or more fuel cells, wherein the second 3-way valve thermally couples the first radiator to the one or more fuel cells, and wherein the first radiator and the second radiator absorb heat generated by the one or more fuel cells.

Example 31 includes the thermal management system of any of Examples 23-30, wherein the one or more fuel cells comprise at least two fuel cells.

Example 32 includes the thermal management system of Example 31, wherein the at least two fuel cells are thermally coupled in parallel to one another.

Example 33 includes a thermal management system for a vehicle, comprising: a common radiator; at least one brake resistor coupled to the common radiator; and one or more batteries coupled to the common radiator, wherein when the brake resistor is determined to be in operation, the common radiator absorbs heat generated by the brake resistor, and wherein when the brake resistor is determined to not be in operation, the common radiator absorbs heat generated by the one or more batteries.

Example 34 includes the thermal management system of Example 33, further comprising: a refrigeration system coupled to the one or more batteries, wherein when the brake resistor is determined to be in operation, the refrigeration system absorbs heat generated by the one or more batteries.

Example 35 the thermal management system of any of Examples 33-34, further comprising: a first 3-way valve, wherein the brake resistor is coupled to the first 3-way valve, wherein the one or more batteries are coupled to the first 3-way valve, and wherein the common radiator is coupled to the first 3-way valve, wherein when the brake resistor is determined to be in operation, the first 3-way valve thermally couples the first radiator with the brake resistor, and wherein when the brake resistor is determined not to be in operation, the first 3-way valve thermally couples the first radiator to the one or more batteries.

Example 36 includes the thermal management system of Example 35, further comprising: a refrigeration system coupled to the one or more batteries; and a second valve, wherein the first radiator is coupled to the second valve, wherein the one or more batteries are coupled to the second valve, wherein the refrigeration system is coupled to the second valve, wherein when the brake resistor is determined to be in operation, the second valve thermally couples the refrigeration system with the one or more batteries and the refrigeration system absorbs heat generated by the one or more batteries.

Example 37 includes the thermal management system of any of Examples 35-36, wherein the second valve is a 4-way valve, and wherein the second valve is further coupled to an auxiliary heater.

Example 38 includes the thermal management system of claim 34, further comprising: a shut-off valve, wherein the one or more batteries are coupled to the shut-off valve, and wherein the brake resistor is coupled to the shut-off valve; wherein the second valve is a 4-way valve, and wherein the brake resistor is coupled to the second valve, and wherein the one or more batteries are coupled to the second valve; and wherein when ambient temperature is determined to be less than a first temperature threshold, the shut-off valve thermally couples the one or more batteries to the brake resistor, and the 4-way valve thermally couples the brake resistor to one or more batteries.

Example 39 includes a thermal management system for a vehicle, comprising: an electric power source loop comprising at least one battery; a heating component thermally coupled to the electric power source loop; wherein when ambient temperature is less than a first temperature threshold, the heating component pre-heats the at least one battery.

Example 40 includes the thermal management system of Example 39, wherein the heating component comprises at least one brake resistor.

Example 41 includes the thermal management system of Example 40, further comprising: a common radiator thermally coupled to the electric power source loop; and a brake resistor loop comprising the at least one brake resistor and a brake resistor controller thermally coupled to the common radiator; wherein when the ambient temperature is greater than the first temperature threshold and wherein when the brake resistor loop is determined to be in operation, the common radiator absorbs heat generated by the brake resistor loop.

Example 42 includes the thermal management system of Example 41, further comprising: an alternate cooling system thermally coupled to the electric power source loop, wherein when the brake resistor loop and the electric power source are determined to be in operation at the same time, the alternate cooling system absorbs heat generated by the electric power source loop.

Example 43 includes the thermal management system of Example 42, wherein the alternate cooling system comprises a refrigeration system.

Example 44 includes the thermal management system of any of Examples 39-43, wherein the electric power source loop comprises three batteries, and wherein each battery is thermally coupled in parallel with the other batteries.

Example 45 includes the thermal management system of any of Examples 39-44, wherein the electric power source loop further comprises at least one fuel cell.

Example 46 includes the thermal management system of Example 42, wherein the alternate cooling system comprises a second radiator.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermal management system for a vehicle, comprising:
   a common radiator;
   at least one brake resistor coupled to the common radiator;
   one or more batteries coupled to the common radiator; and
   an alternate cooling system thermally coupled to the one or more batteries,
   wherein, when the brake resistor is determined to be in operation, the common radiator absorbs heat generated by the brake resistor and the alternate cooling system absorbs heat generated by the one or more batteries, and wherein, when the brake resistor is determined to not be in operation, the common radiator absorbs heat generated by the one or more batteries.

2. The thermal management system of claim 1, wherein the alternate cooling system comprises a refrigeration system.

3. The thermal management system of claim 1, further comprising:
a first 3-way valve coupled to the brake resistor, the one or more batteries, and the common radiator,
wherein, when the brake resistor is determined to be in operation, the first 3-way valve thermally couples the common radiator with the brake resistor, and
wherein, when the brake resistor is determined not to be in operation, the first 3-way valve thermally couples the common radiator to the one or more batteries.

4. The thermal management system of claim 3, further comprising:
a refrigeration system coupled to the one or more batteries; and
a second valve coupled to the common radiator,
wherein the one or more batteries are coupled to the second valve,
wherein the refrigeration system is coupled to the second valve, and
wherein, when the brake resistor is determined to be in operation, the second valve thermally couples the refrigeration system with the one or more batteries and the refrigeration system absorbs heat generated by the one or more batteries.

5. The thermal management system of claim 4, wherein the second valve is a 4-way valve.

6. The thermal management system of claim 5, further comprising:
a shut-off valve coupled to the one or more batteries and the brake resistor,
wherein the brake resistor is coupled to the second valve, wherein the one or more batteries are coupled to the second valve, and wherein, when an ambient temperature is determined to be less than a first temperature threshold, the shut-off valve thermally couples the one or more batteries to the brake resistor and the 4-way valve thermally couples the brake resistor to one or more batteries.

7. The thermal management system of claim 6, wherein the second valve is further coupled to a heating component, and wherein, when the ambient temperature is less than a first temperature threshold, the heating component pre-heats at least one of the one or more batteries.

8. The thermal management system of claim 1, wherein the one or more batteries comprises three battery packs.

9. The thermal management system of claim 8, wherein each of the three battery packs is coupled in parallel.

10. The thermal management system of claim 8, wherein each of the three battery packs is coupled to a respective battery shut-off valve, and
wherein, when the battery shut-off valve is open, the respective battery is coupled to at least one other component of the thermal management system.

11. The thermal management system of claim 8, wherein each of the three battery packs is further coupled to a check valve.

12. A method for thermal management of an electric vehicle, the method comprising:
determining if a brake resistor comprised within the vehicle is in operation, wherein the vehicle further comprises a common radiator and at least one battery pack;
when the brake resistor is in operation, utilizing the common radiator to cool the brake resistor; and
when the brake resistor is not in operation, utilizing the common radiator to cool the at least one battery pack,
wherein, responsive to a determination that the brake resistor is in operation, the method further comprises:
determining if the at least one battery pack is in operation; and
when the at least one battery pack is in operation, utilizing an alternate cooling system to cool the at least one battery pack.

13. The method of claim 12, wherein utilizing an alternate cooling system to cool the at least one battery pack further comprises using a refrigeration system to cool the at least one battery pack.

14. The method of claim 12, wherein responsive to a determination that the brake resistor is in operation, the method further comprises:
determining if an ambient temperature is greater than a second temperature threshold; and
when the ambient temperature is greater than a second temperature threshold, utilizing a refrigeration system to cool the at least one battery pack.

15. The method of claim 14, wherein the second temperature threshold is between 25 degrees Celsius and 35 degrees Celsius.

16. A thermal management system, comprising:
a common radiator;
a brake resistor coupled to the common radiator;
three battery packs, wherein each battery pack is coupled in parallel with at least one other battery back, and wherein each of the three battery packs are coupled to the common radiator; and
a refrigeration system coupled to the three battery packs,
wherein, when the brake resistor is determined to be in operation, the common radiator absorbs heat generated by the brake resistor, and the refrigeration system absorbs heat generated by the three battery packs, and
wherein, when the brake resistor is determined to not be in operation, the common radiator absorbs heat generated by the three battery packs.

* * * * *

UNITED STATES PATENT AND TRADEMARK OFFICE
CERTIFICATE OF CORRECTION

PATENT NO. : 11,458,799 B2
APPLICATION NO. : 17/557396
DATED : October 4, 2022
INVENTOR(S) : Aiden Cohan et al.

It is certified that error appears in the above-identified patent and that said Letters Patent is hereby corrected as shown below:

In the Drawings

FIG. 1 should appear as shown on the attached drawing sheet.

Signed and Sealed this
Twenty-third Day of May, 2023

Katherine Kelly Vidal
*Director of the United States Patent and Trademark Office*

Fig. 1